United States Patent [19]

Kisslig

[11] Patent Number: 4,561,284
[45] Date of Patent: Dec. 31, 1985

[54] SHEET METAL WORKING DEVICE

[76] Inventor: Heinz Kisslig, Hauptstrasse 70, CH-8552 Felben, Switzerland

[21] Appl. No.: 604,893

[22] Filed: Apr. 27, 1984

[51] Int. Cl.⁴ .............................................. B21C 3/02
[52] U.S. Cl. ...................................... 72/464; 72/389; 83/620; 29/34 R
[58] Field of Search ................ 72/464, 449, 481, 389, 72/294; 29/34 R, 56.5, 560; 83/620, 622

[56] References Cited

U.S. PATENT DOCUMENTS 484,369 10/1892 Horner .................................. 83/620

FOREIGN PATENT DOCUMENTS 2111891 7/1983 United Kingdom .................. 72/449

Primary Examiner—Francis S. Husar
Assistant Examiner—Robert Showalter
Attorney, Agent, or Firm—Thomas W. Speckman

[57] ABSTRACT

A sheet metal working device comprising a movable carrier supported between two side panels of C-shaped form. The carrier has the form of a bar which may be mechanically moved by a drive means and which at its top portion is connected to a sharpened piece which serves as a movable blade and acts together with a replaceable stationary blade as shears. A holding device is disposed on the lower portion of the carrier which holds the top tool of a stamping device or a folding press. The sheet metal working device may operate as a stamping device or folding press.

6 Claims, 2 Drawing Figures

SHEET METAL WORKING DEVICE

BACKGROUND OF THE INVENTION

1. Field of the Invention

The present invention relates to a sheet metal working device with a carrier that is moved mechanically by a drive means connected to a lever, and which is supported in two side panels having a C-shaped form, which side panels are connected to each other by means of at least one crossbar.

2. Description of the Prior Art

Sheet metal working devices or machines of the above described construction are known as presses, especially folding presses, shears and stamping tools. Such machines are commonly found in sheet metal working plants. For small workshops, and especially for do-it-yourselfers, such machines are prohibitively expensive.

SUMMARY OF THE INVENTION

The present invention is designed to provide a simple, economical and versatile sheet metal working device suitable for use in small workshops and by do-it-yourselfers. The two side panels of the device have slots to support a carrier provided on its top portion with an inverted L-profile piece sharpened as a cutter, and on its bottom portion with a holding device to receive a top tool of a stamping device or folding press.

The special design of the carrier makes it possible, depending on the direction of its movement, for the device to serve in the upward direction as shears, and as a folding press or stamping device in the downward direction. If a replaceable crossbar is provided as the bottom cutter of the shears, then the production cost will be even lower.

DESCRIPTION OF PREFERRED EMBODIMENTS

Figure 1:
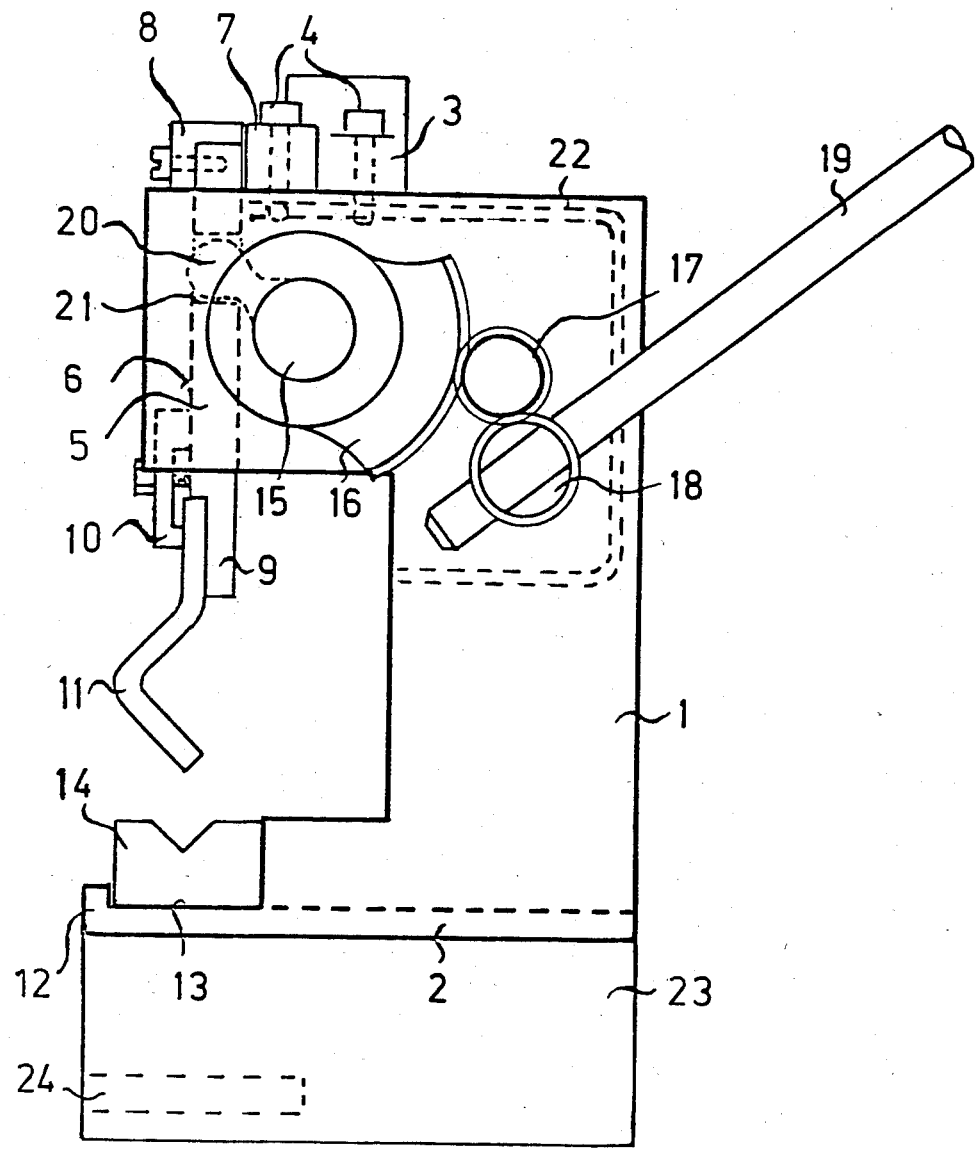
FIG. 1 shows a side view of one embodiment of a sheet metal working device of this invention.
Figure 2:
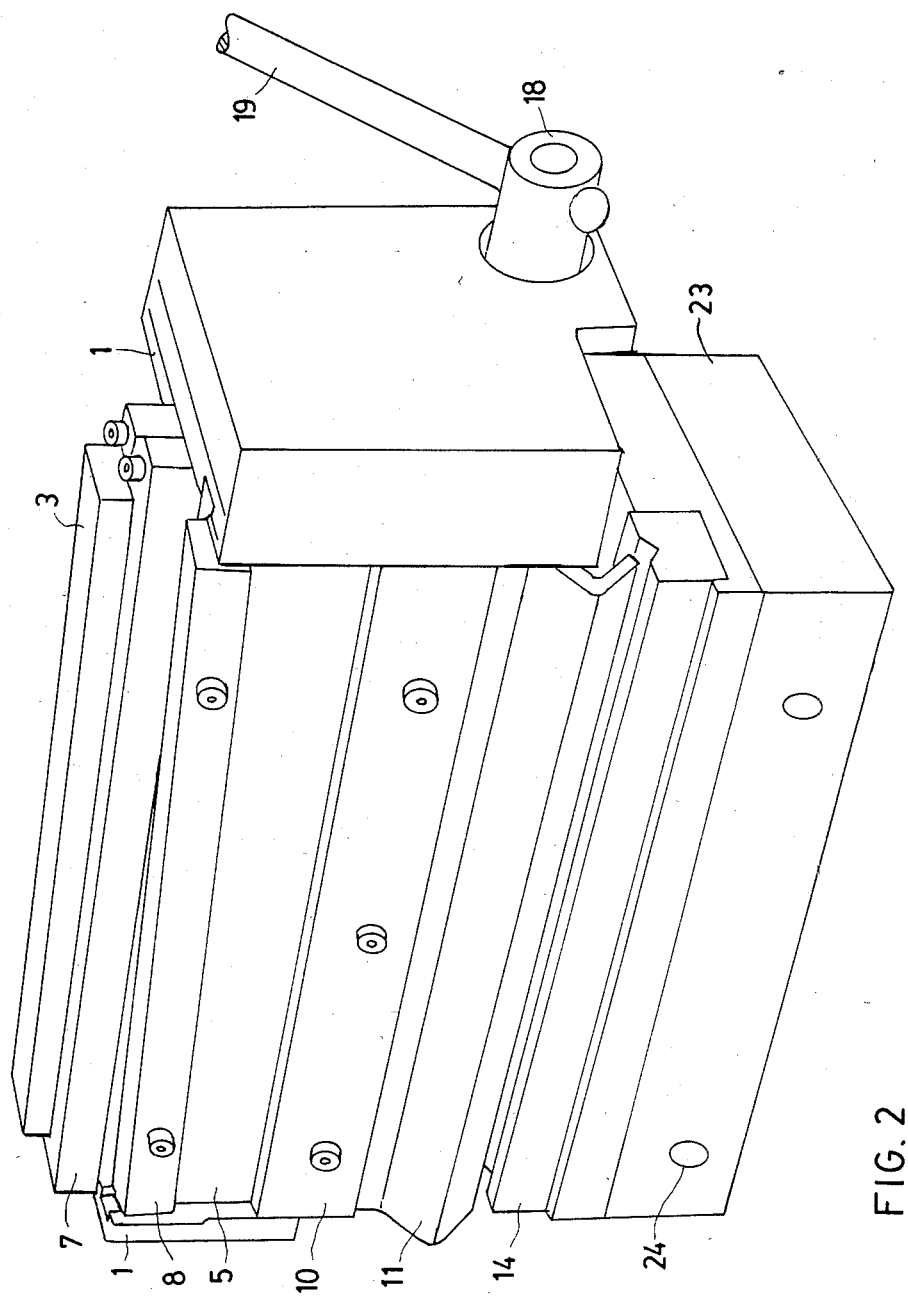
FIG. 2 shows a perspective front view of one embodiment of a sheet metal working device of this invention.

In FIG. 1, one of two side panels 1 of C-shaped form is clearly shown. The side panels 1 are arranged vertically and parallel to each other, so only one side panel is visible. The side panels 1 are each firmly connected to support plate 2. Support plate 2 with side panels 1 may form a U-shaped profile, as shown in FIG. 1. A removable crossbar 3 is mounted by bolts 4 onto side panels 1. Support plate 2 and side panels 1 with crossbar 3 provides a stable framework construction. Between the side panels 1, carrier 5 is supported in guide slots 6. Crossbar 3 retains square cut crossbar 7 which serves as the top stationary blade of the shears. The front surface of crossbar 7 aligns perfectly with the rear wall of guide slots 6. The top side of carrier 5 is connected to a sharpened inverted L-profile bar 8 that serves as the bottom movable blade of the shears.

Accordingly, crossbar 3 both stabilizes the device and retains the stationary blade of the shears. Both blades of the shears, square cut crossbar 7 as well as sharpened inverted L-profile bar 8, may be replaceable.

The bottom portion 9 of carrier 5 is stepped and provided with holding means 10. Holding means 10 serves to accept in a positive-locking manner and firmly hold a variety of top tools 11, such as a tool for the right-angled bending of a sheet. The bottom portion 9 may also be provided with a holding device that will accept and hold the die of a stamping tool.

Support plate 2 extends in front of side panels 1 and forms lip 12 which provides a recess 13 for replaceable bottom tool 14. In the drawing, a bottom tool 14 for bending is shown, but recess 13 may also accommodate the die of a stamping tool.

Shaft 15 is supported in the side panels adjacent to guide slots 6. Forceably fitted onto shaft 15 is gear segment 16 which meshes on its outerside with gear 17. Gear 17 in turn engages gear 18 with outside toothing. Gear 18 has a central transverse bore. Movable lever 19 is inserted into the central transverse bore of gear 18. Force may be exerted on lever 19 to drive shaft 15. The drive comprising gears 18 and 17 and gear segment 16 and the length of lever 19 determine the force ratio.

Shaft 15 is provided with at least one driver means 20. Driver means 20 is engaged in recess 21 in carrier 5. When shaft 15 is turned, driver means 20 moves carrier 5 in guide slots 6 of side panels 1. Thus carrier 5 moves up or down, depending on the direction of movement of the lever.

An approximately U-shaped sheet metal casing 22, shown in broken lines in the drawing, is welded between the side panels. The top of sheet metal casing 22 is parallel to the top edges of side panels 1 and just slightly below these edges.

Sheet metal casing 22 has multiple functions. It serves to protect the shaft against fouling, and it provides additional stability to the whole device. The top flat area of sheet metal casing 22, however, may also serve as a table or firm platform for a piece of sheet metal being cut.

Base 23 to which support plate 2 is fastened serves to stabilize the device. The front of base 23 may have openings 24 to receive screw clamps for fastening the apparatus to a table top or workbench.

The space between sheet metal casing 22 and crossbar 3 should be approximately the maximum sheet metal thickness that is desired to be handled by the device.

For lighter duty work purposes, provision may be made for a 200 mm working width, which permits a working pressure of about 1000 kg. For shop operations, a similar device may be used with a working width of approximately 500 mm, which can accommodate sheet metal of approximately 1 mm thickness, and provide a force of approximately 4 to 5 tons.

I claim:

1. Sheet metal working device comprising two C-shaped side panels (1) having guide slots (6) on their inside opposing surfaces and connected to each other by at least one crossbar (3), a movable carrier (5) extending between said side panels and reciprocally movable in said guide slots (6) by mechanical drive means operated by hand lever (19), characterized by said carrier being provided on its top portion with a sharpened inverted L-profile bar (8) serving as a movable blade cooperating with a stationary crossbar (7) retained by said crossbar (3) to function as sheet metal shears when said carrier (5) is moved upwardly, and said carrier being provided on its lower portion (9) with a holding means (10) to hold a top sheet metal working tool (11) cooperating with a stationary bottom tool (14) when said carrier (5) is moved downwardly.

2. Sheet metal working device according to claim 1, wherein said carrier (5) has at least one recess (21), in which at least one driver means (20) mates, said driver means (20) being attached to a shaft (15) supported by said two side panels (1), said shaft (15) being in mechanical communication with and rotated by movement of said hand lever (19).

3. Sheet metal working device according to claim 1, wherein a U-shaped sheet metal casing (22) is disposed between said side panels (1), the top surface of said casing extending parallel to top edges of said side panels (1) and slightly below said edges, said top surface serving as a table for a piece of sheet metal to be cut.

4. Sheet metal working device according to claim 1, wherein said two side panels (1) are joined to a support plate (2) at their lower ends to form a U-shaped profile.

5. Sheet metal working device according to claim 4, wherein said support plate (2) extends in front of said two side panels (1) and has an upward extending lip 12 coextensive with said support plate (2) forming a recess (13) for holding a replaceable bottom tool (14).

6. Sheet metal working device according to claim 4, wherein said support plate (2) is fastened to a base (23).

* * * * *